July 26, 1949. L. W. YOUNG 2,477,108
BLOWPIPE MACHINE SPEED CONTROL MECHANISM
Filed Sept. 13, 1944 2 Sheets-Sheet 1
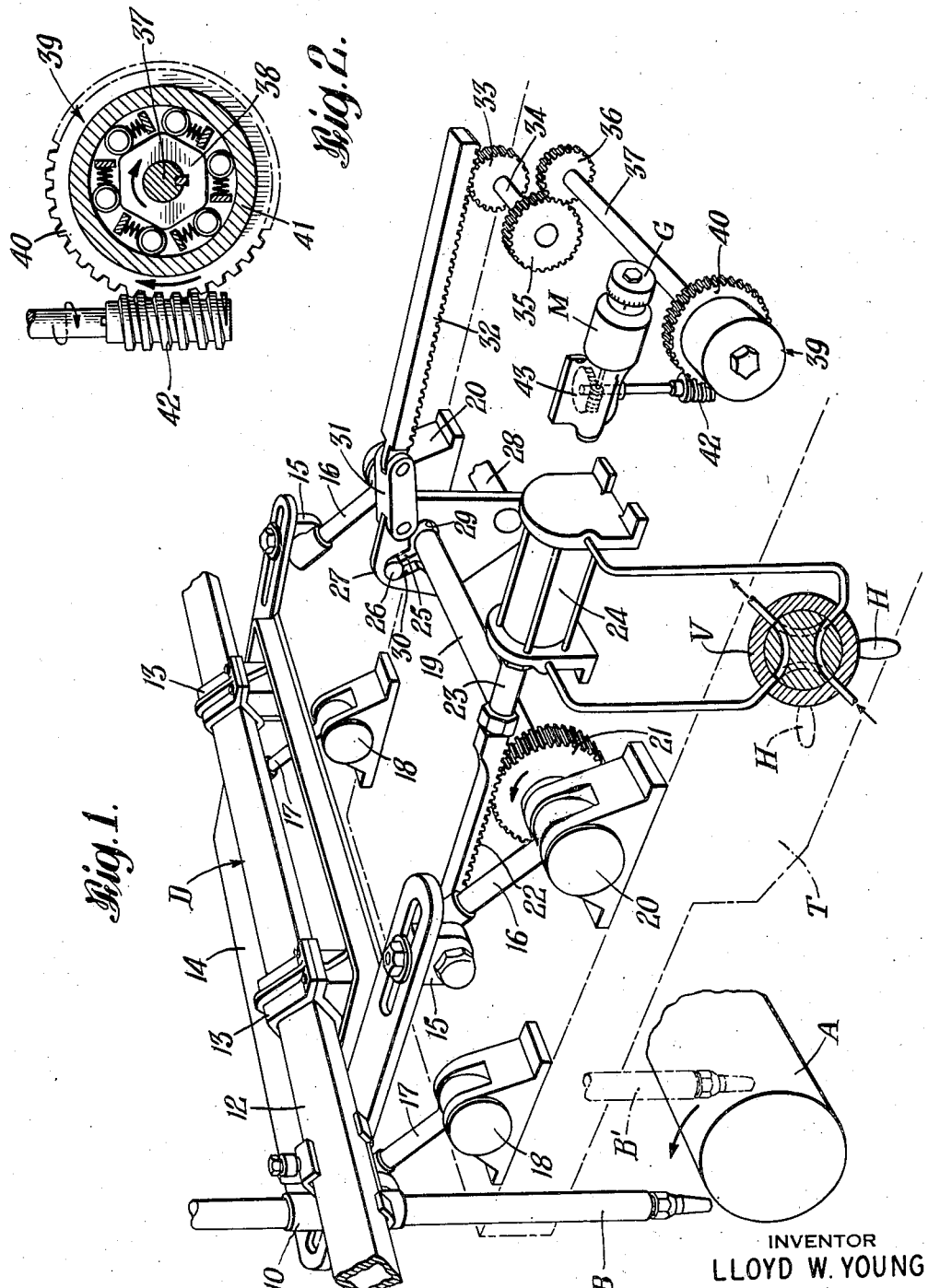
INVENTOR
LLOYD W. YOUNG
BY
*F. Greenewald*
ATTORNEY

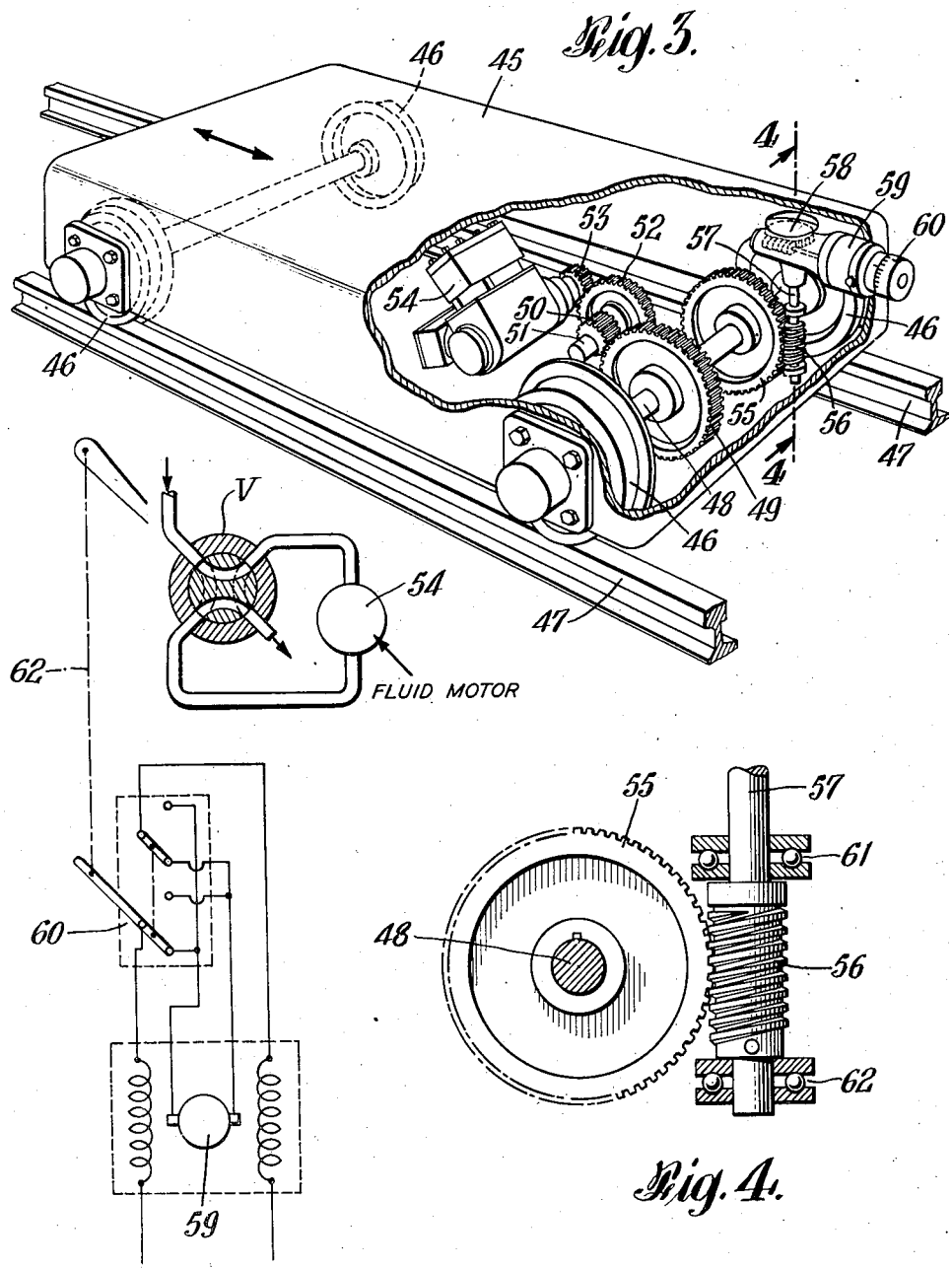

Patented July 26, 1949

2,477,108

UNITED STATES PATENT OFFICE 2,477,108

BLOWPIPE MACHINE SPEED CONTROL MECHANISM

Lloyd W. Young, Elizabeth, N. J., assignor to The Linde Air Products Company, a corporation of Ohio Application September 13, 1944, Serial No. 553,846

4 Claims. (Cl. 266—23)

This invention relates to speed control mechanism, and more particularly to devices of this character for preventing the speed of moving parts of a machine from exceeding a selected or predetermined rate.

While the invention is of broad application to the driving arrangements for various types of machines, it is of particular utility for use in conjunction with cutting, welding and heating machines, the speed controls of which heretofore provided have all been subject to various disadvantages. Variable speed drives for such machines have made use of pneumatic cylinders, springs, or electric motors as their propelling or primary driving means, or the speed or rate of travel of the machine has been controlled by regulating the speed of the motor, or in the case of a fluid speed control, by regulating the quantity of fluid that will flow from one side of a piston to the other.

When a variable speed electric motor is employed as the motivating or primary driving means, as well as a speed control, the motor control circuit and associated apparatus is complicated and also the speed range is usually limited to three or four to one. This is particularly true when the cutting or welding machine is of considerable size requiring one or more horsepower to drive the same.

Hydraulic speed controls wherein the speed of the machine is controlled by regulating the flow of a fluid while passing from one side of a piston to the other, have several undesirable features. For example, variations in the viscosity of the fluid due to changes in temperature cause undesired alteration of the speed of the machine.

Machines hydraulically controlled and pneumatically driven vary in speed when there is a variation in the air pressure supplying the operating cylinder. In hydraulically controlled spring driven machines the speed gradually decreases as the spring is released and thus becomes weaker. Spring driven fluid controlled machines are definitely restricted to short stroke applications.

The main object of the present invention is therefore to provide an improved speed control which avoids the disadvantages referred to above.

Another object is to provide a speed control separately driven at the desired rate of speed, and interconnected with the primary driven device to hold back the same and prevent the moving parts thereof from exceeding a predetermined rate of speed.

A sudsidiary object is to provide the speed control with means automatically operable to release the primary driving means for movement in the reverse direction.

Other objects and features of novelty will be apparent as the following description proceeds, reference being had to the accompanying drawings, in which:

Fig. 1 is a diagrammatic perspective view of the speed control as applied to a thermochemical cutting machine of the type shown in the copending application of Young and James, Serial No. 418,225, filed November 7, 1941, now abandoned, to which reference may be had for details of the machine not related to the speed control according to the present invention;

Fig. 2 is a section through a diagrammatically illustrated free-wheeling clutch which may be employed in the arrangement shown in Fig. 1;

Fig. 3 is a perspective view of a modified form of the invention as applied to the carriage of a blowpipe machine, the casing of the carriage being broken away to show the internal construction;

Fig. 4 is an enlarged detail sectional view taken along the line 4—4 of Fig. 3; and showing the anti-friction bearings; and Fig. 5 is a diagram showing the interconnection of the operating valve and the reversing switch.

In the example illustrated, a pneumatic cylinder serves as a propelling means or primary driving means for the machine, and the rate at which the machine will travel is regulated by a small governor-controlled fractional horsepower electric motor which serves merely as a hold-back or restraining device. This small fractional horsepower motor is connected with a driven shaft member through a worm and worm gear having a pitch angle sufficiently low that the full torque of the drive will not be transmitted to the motor. In other words, the speed or rate of travel of the machine can not exceed the speed at which the governor controlled motor has been set, regardless of varying air pressure to the cylinder or varying loads within the machine proper.

While the present invention is applicable to machines having continuous rotary motion or other motions of various types, it is particularly applicable to machines having a reciprocating motion, such as those in which after each operation a cutting blowpipe must be retracted to the starting position. For this purpose an overrunning or free-wheeling clutch is interposed between a driven shaft and the motor worm gear. The driven shaft to which the free-wheeling clutch is attached, is keyed to a polygonal inner race. An outer race having a cylindrical inner surface rotates around the inner race on a series of rolls. These rolls are spring loaded in one direction so that they will bind or lock up and prevent the inner race exceeding the speed of the outer race. A worm gear is attached to the outer race and meshes with a worm driven by the speed control motor; thus the speed of the driven shaft will not exceed the speed of the worm gear and the driven shaft may be reversed for retracting the blowpipe without stopping the speed control motor or worm gear.

Referring more particularly to the drawings, the blowpipe machine is adapted to move one or more cutting blowpipes B across stock such as the steel billet A, by mechanism D mounted on a boom T. The blowpipe B is mounted in a holder 10 slidably mounted on a rectangular tube 12 and adjustably secured in position. The tube 12 is supported by a pair of brackets 13 extending upwardly from plate 14.

The plate 14 has adjustably secured thereto depending brackets 15 to which links 16 are adjustably and pivotally secured. Similar links 17 are similarly mounted at the forward end of the plate 14 and are pivotally supported in bearings 18 on the boom T. The links 16 are connected to a shaft 19 journaled in bearings 20 on the boom T, so that the links 16 and shaft 19 move in unison. On the shaft 19 there is mounted a spur gear 21 adapted to mesh with the rack 22 attached to or formed as a part of the piston rod 23 of a piston working in cylinder 24.

Compressed air or other fluid for operating the piston in cylinder 24 is shown controlled by a four-way valve V having a handle H. When the handle H is in the position shown in solid outline, air enters the rearward end of the cylinder and exhausts from the forward end. Thus the piston rod 23 and the rack 22 are driven forward, and rotate spur gear 21 and shaft 19 in counter-clockwise direction. Moving handle H to the left, as shown by the dotted outline, connects an air inlet line to the forward end of the cylinder and permits air to exhaust from the rearward end of the cylinder, thereby retracting piston rod 23 and rack 22 and rotating the shaft 19 in a clockwise direction. Thus it will be seen that when the piston in cylinder 24 moves from right to left, the blowpipe B will move over the work A from the starting position shown at B' to the finish position shown at B.

For varying the arcuate speed of the blowpipes, on the shaft 19 there is mounted a relatively short crank arm 25 having a roller 26 pivotally mounted on its outer end. A cam 27 is pivotally mounted on a fixed pin 28, and this cam is provided with a substantially T-shaped slot. The shaft 19 extends through the arcuate portion 29 of the slot which permits cam 27 to swing through an arc about the axis of pin 28. The roller 26 engages a straight portion 30 of the slot. The arcuate movement of the cam 27 is retarded so as to cause the shaft 19 and crank 25 to rotate at a non-uniform speed which in turn causes the blowpipe B to move at a non-uniform arcuate speed.

The roller 26 being attached to a lever arm 25 which is keyed to the shaft 19, rotation of shaft 19 will impart a rocking motion to the cam 27 and move the link 31 and the rack 32. This particular arrangement of the cam 27 and the roller 26 causes the speed of the blowpipe to decelerate as the blowpipe approaches the center section of a round bar where the metal is the thickest, and to accelerate as the blowpipe approaches the finish or thinner section of the bar, when the velocity of the rack 32 is uniform.

The rack 32 is in constant mesh with spur gear 33 which is keyed to a shaft 34. The other end of shaft 34 is keyed to a change gear 35 which meshes with a similar change gear 36. Change gears 35 and 36 are interchanged when the machine is converted from operation upon round bars to operation upon square bars. The change gear 36 is keyed to a shaft 37, and the other end of the shaft 37 as shown in Fig. 2, is keyed to the inner race 38 of a free-wheeling clutch 39, and anti-friction bearings (not shown) are provided between the shaft 37 and a worm gear 40. The worm gear 40 is secured to the outer race 41 of the free-wheeling clutch 39 and meshes with a worm 42 which is geared to the governor controlled motor M through worm and worm gear reduction unit 43. The motor M may be of the fractional horsepower series universal type and controlled by any conventional make and break type of governor G.

In a cutting operation, it will be assumed that the blowpipe is in the starting position as shown at B' and the motor M is running at a predetermined speed suitable for cutting, and the worm gear 40 is rotated clockwise. Introducing air into the rearward end of the cylinder 24 rotates the shaft 19 counter-clockwise, moves the rack 32 to the left, rotates the shaft 34 counter-clockwise and the shaft 37 clockwise. When the speed of the shaft 37 synchronizes with the speed of the worm gear 40, the free-wheeling clutch 39 binds or locks up, thus preventing the speed of the shaft 37 from exceeding the speed of the worm gear 40. The worm gear 40 and the worm 42 are of the single thread type having a low pitch angle in order that no torque can be transmitted from the shaft 37 to the motor M. Shaft 19, shaft 34 and shaft 37 continue to rotate until the blowpipe has completed the cutting operation and has arrived at the position shown by the blowpipe B.

At the completion of the cutting cycle, the handle H of four-way valve V is moved from the position shown in solid outline to the position shown in dotted line, thus introducing air into the forward end of the cylinder 24, and exhausting air from the rearward end. This operation retracts or moves the piston rod 23 and the rack 22 to the right, rotates the shaft 19 clockwise, moves the rack 32 to the right, rotates the shaft 34 clockwise and the shaft 37 counter-clockwise. As previously pointed out, worm gear 40 rotates at a constant speed in a clockwise direction, so that when the shaft 37 rotates counter-clockwise, the free-wheeling clutch will release, thereby permitting the blowpipe to be rapidly retracted to the starting position.

In the embodiment of the invention shown in Figs. 3, 4, and 5, a blowpipe carriage 45 is mounted on wheels 46 engaging rails 47 of a track. The driving wheels are keyed to a shaft 48 on which is keyed a spur gear 49, meshing with a pinion 50 keyed on a shaft 51. A spur gear 52 is keyed on the shaft 51 and meshes with a pinion 53 on the output shaft of a fluid motor 54, which may be of the conventional piston or vane type and operated by air or water. A water motor is advantageous where large quantities of water are used for cooling or quenching purposes.

To control the speed of the motor 54, a worm gear 55 is keyed to the shaft 48 and meshes with a worm 56 on the output shaft 57 of reduction unit 58, on a speed control motor 59. This motor 59 is provided with a wide range electrical make and break governor 60.

If free-wheeling is desired in this embodiment, manually operated clutches (not shown) may be employed between the shaft 48 and spur gear 49 and worm gear 55, both of which must be disengaged simultaneously.

The fluid motor 54 is reversible, and reversing the direction of the motor reverses the thrust on the worm 56. For this reason anti-friction bearings 61 and 62 are provided, as shown in Fig. 4.

When the fluid motor 54 is reversed, the speed control motor 59 must also be reversed, and an automatic arrangement for this purpose is shown in Fig. 5. A motor reversing switch 60 for the motor 59 is interlocked with the four-way valve V by means of a link 62. This switch and valve interlock insures that the electric motor 59 is reversed simultaneously with the fluid motor 54, and that the speed control motor 59 will be turned off when the fluid motor 54 is turned off.

What is claimed is:

1. In a blowpipe machine having mechanism for supporting a blowpipe for movement across metal stock for working and return strokes and having a fluid pressure drive; the combination of a constant speed motor and an overrunning clutch driven from said motor by worm gearing and connected to said fluid pressure drive, whereby said motor and worm gearing hold back the fluid pressure drive for the working stroke and the overrunning clutch releases the fluid pressure for the return stroke.

2. In a blowpipe machine having mechanism for supporting a blowpipe for movement across metal stock for working and return strokes and having a fluid pressure drive; the combination of a constant speed motor, an overrunning clutch having an outer race driven from said motor by worm gearing and an inner race connected to said fluid pressure drive, whereby said motor and worm gearing hold back the fluid pressure drive for the working stroke and the overrunning clutch releases the fluid pressure drive for the return stroke.

3. In a blowpipe machine having mechanism for supporting a blowpipe for movement across metal stock for cutting and return strokes and driven by a fluid pressure cylinder, the combination of a governor controlled constant speed electric motor driving a worm, a worm wheel meshing with said worm, an overrunning clutch having an outer race driven by said worm wheel, and a rack connected to said fluid pressure cylinder and driven by the inner race of said overrunning clutch, whereby said motor and worm gearing hold back the fluid pressure cylinder for the cutting stroke, and the overrunning clutch releases said rack and fluid pressure cylinder for the return stroke.

4. In a blowpipe machine having mechanism for supporting a blowpipe for movement across metal stock for operating and return strokes and driven by a fluid pressure cylinder; the combination of a governor controlled constant speed electric motor driving a worm, a worm wheel meshing with said worm, an overrunning clutch having an outer race driven by said worm wheel, and a shaft driven by the inner race of said overrunning clutch and geared to a rack connected to said fluid pressure cylinder, whereby said motor and worm gearing hold back the fluid pressure cylinder drive for the working stroke, and the overrunning clutch releases said shaft, gear and rack of said fluid pressure cylinder drive from said motor and worm gearing for the return stroke.

LLOYD W. YOUNG.

REFERENCES CITED

The following references are of record in the file of this patent:

UNITED STATES PATENTS

| Number | Name | Date |
|---|---|---|
| 1,043,399 | Cole | Nov. 5, 1912 |
| 1,128,442 | Guyot | Feb. 16, 1915 |
| 1,687,001 | Bishop | Oct. 9, 1928 |
| 1,954,549 | Twigg et al. | Apr. 10, 1934 |
| 1,962,677 | Dickey | June 12, 1934 |
| 1,990,530 | Dobson | Feb. 12, 1935 |
| 2,161,121 | Anderson | June 6, 1939 |
| 2,170,503 | Martellotti | Aug. 22, 1939 |
| 2,217,618 | Flygare | Oct. 8, 1940 |
| 2,283,346 | Bucknam et al. | May 19, 1942 |
| 2,292,988 | Bloomfield et al. | Aug. 11, 1942 |
| 2,309,637 | Fickett | Feb. 2, 1943 |
| 2,365,276 | Miller | Dec. 19, 1944 |
| 2,367,492 | Fickett | Oct. 8, 1945 |

FOREIGN PATENTS

| Number | Country | Date |
|---|---|---|
| 288,754 | Great Britain | Apr. 19, 1928 |

Certificate of Correction

Patent No. 2,477,108                                                                     July 26, 1949

LLOYD W. YOUNG

It is hereby certified that error appears in the printed specification of the above numbered patent requiring correction as follows:

Column 5, line 36, after the syllable "sure" and before "for" insert *drive*; and that the said Letters Patent should be read with this correction therein that the same may conform to the record of the case in the Patent Office.

Signed and sealed this 10th day of January, A. D. 1950.

[SEAL]

THOMAS F. MURPHY,
*Assistant Commissioner of Patents.*